United States Patent [19]

Groult et al.

[11] 4,402,197
[45] Sep. 6, 1983

[54] AUTOMATIC WASHING MACHINE OR DISHWASHER

[75] Inventors: Alain Groult, Annemasse, France; Augusto Porta, Carouge, Switzerland; Hervé Tournier, Valleiry, France

[73] Assignee: Battelle Memorial Institute, Carouge, Switzerland

[21] Appl. No.: 293,635

[22] PCT Filed: Dec. 17, 1980

[86] PCT No.: PCT/CH80/00156
§ 371 Date: Aug. 6, 1981
§ 102(e) Date: Aug. 6, 1981

[87] PCT Pub. No.: WO81/01863
PCT Pub. Date: Jul. 9, 1981

[30] Foreign Application Priority Data

Dec. 20, 1979 [CH] Switzerland ............ 11313/79
Dec. 20, 1979 [CH] Switzerland ............ 11314/79

[51] Int. Cl.³ ............... D06F 39/02; C25B 1/26
[52] U.S. Cl. .................. 68/12 R; 68/13 A; 68/207; 134/57 D; 204/95
[58] Field of Search ......... 68/12 R, 13 A, 207; 204/95, 275, 272; 134/57 D

[56] References Cited

U.S. PATENT DOCUMENTS

| | | | |
|---|---|---|---|
| 3,085,416 | 4/1963 | D'Hooge | 68/207 X |
| 3,210,262 | 10/1965 | Klein | 204/95 X |
| 3,390,065 | 6/1968 | Cooper | 204/95 |
| 3,925,174 | 12/1975 | Eng et al. | 204/95 |
| 4,118,306 | 10/1978 | Labarre | 204/268 |
| 4,151,052 | 4/1979 | Goto et al. | 204/95 |
| 4,188,807 | 2/1980 | Graf et al. | 68/207 X |

FOREIGN PATENT DOCUMENTS 2423 6/1979 European Pat. Off. .......... 68/12

OTHER PUBLICATIONS

"The Electrolysis of Hypochlorite Solution", by F. Forester, American Electrochemical Society, vol. XLVI, pp. 23–50, 1924.

*Primary Examiner*—Philip R. Coe
*Assistant Examiner*—Frankie L. Stinson
*Attorney, Agent, or Firm*—Karl F. Ross; Herbert Dubno

[57] ABSTRACT

This washing machine is provided with an electro chemical cell (4) having a brine tank (9) provided with a metering piston (16a, b 16b) actuated by an electro magnet (21) and connected by an electro valve (14) controlling a connection conduit (3) to a water supply conduit (1). The inlet opening of such connection conduit into the cell (4) is controlled by a float valve (11). The electro valve is a two-way valve (14, 14a) and controls simultaneously the outlet conduit (13) which opens into the washing tub of the washing machine. The power supply of the cell (4) is controlled by the program selector (8) of the machine.

5 Claims, 2 Drawing Figures

AUTOMATIC WASHING MACHINE OR DISHWASHER

TECHNICAL FIELD

The present invention cconcerns an automatic machine for washing cloth or dishes in which sodium hypochlorite can be added separately if desired to the scouring bath for bleaching, disinfecting or obtaining both effects simultaneously.

PRIOR-ART

There was already proposed in application EP No. 0.002.423 to provide a cloth-washer with an electrochemical cell for producing hydrogen peroxide comprising a cathode compartment and an anode compartment capable of producing sodium hypochlorite together with hydrogen peroxide. The combination of the two substances gives singlet oxygen which is a very powerful bleaching agent. However, such a mixture is not suitable for applications where only a bactericide and fungicide action is sought; it is either not adapted to being used in dish-washers.

There was also proposed in U.S. Pat. No. 4,118,307 a sodium hypochlorite production cell comprising means for dispensing relatively concentrated metered quantities of hypochlorite.

However, such a cell is especially usable in the case of swimming pools or in any application where the use of hypochlorite is relatively constant. It is indeed known that hypochlorite formed in such a cell is not storage stable since it is not stabilized. It should therefore be used immediately. Now, household cloth- and dish-washers only operate periodically and such a cell is not adapted thereto. Further, the use of concentrated hypochlorite may cause damage to clothes since its dilution into the scouring bath is not instantaneous. In addition, the accurate dispensing of small concentrated hypochlorite volumes is difficult to achieve.

Besides, it is not possible to contemplate using industrial types of hypochlorite production cells for forming concentrated solutions in very small quantities.

On the other hand, it has already been proposed in DOS No. 2.134.850 a dish-washing process according to which one forms a scouring bath with a scouring agent containing an enzyme additive and heating to 55° C., then a scouring agent with an active chlorine containing compound is introduced and the bath is heated to 65° C. Unfortunately, it is difficult to implement this method with commercial Javel water because of storage problems in the presence of a heat source due to the nearness of the washing tank. Moreover, since the required quantities of NaOCl for each washing operation are small, it is not possible to have the user introduce himself, with each operation, metered quantities so small with the required accuracy. Thus, the means for carrying out a method such as that proposed by this document is still a problem.

Further to these problems, it should still be remarked that the required hypochlorite concentration may significantly vary depending on the effect desired, which means that the means for supplying hypochlorite to the washing bath should be able to vary the concentration thereof between relatively wide limits.

DISCLOSURE OF THE INVENTION

The object of the present invention is to solve the problem of supplying metered hypochlorite quantities to automatic cloth- or dish-washers.

Hence, the invention concerns an automatic machine for washing clothing or dishes, which comprises a cell for the electrolytic production of sodium hypochlorite, a brine holder-tank, a water supply, means for connecting said holder-tank to said cell, means for connecting said cell with said water supply, means for controlling the volume of water introduced into the cell and means for introducing measured quantities of brine into said cell.

The electrochemical cell with which the washing machine according to the invention is fitted is devised for providing it with a wide operating sufficiency and for enabling it to be easily adaptable to the various uses for which the hypochlorite produced is intended. The production of low concentration hypochlorite enables one to give the cell appropriate dimensions for producing the required hypochlorite quantity within a period compatible with the washing cicle duration. The controlled sampling means enable to adapt this concentration to the needs. Further, no more than the amount required for one washing operation may be provided, thus avoiding the problems of hypochlorite decomposition under storage.

BRIEF DESCRIPTION OF THE DRAWING

The annexed drawing illustrates very schematically, and as examples, two embodiments of an automatic washing machine, the subject matter of the present invention.

BEST MANNERS OF ACHIEVING THE INVENTION

In the description that follows, only the elements of the cloth- and dish-washers which are necessary for comprehending the present invention will be described.

Figure 1:
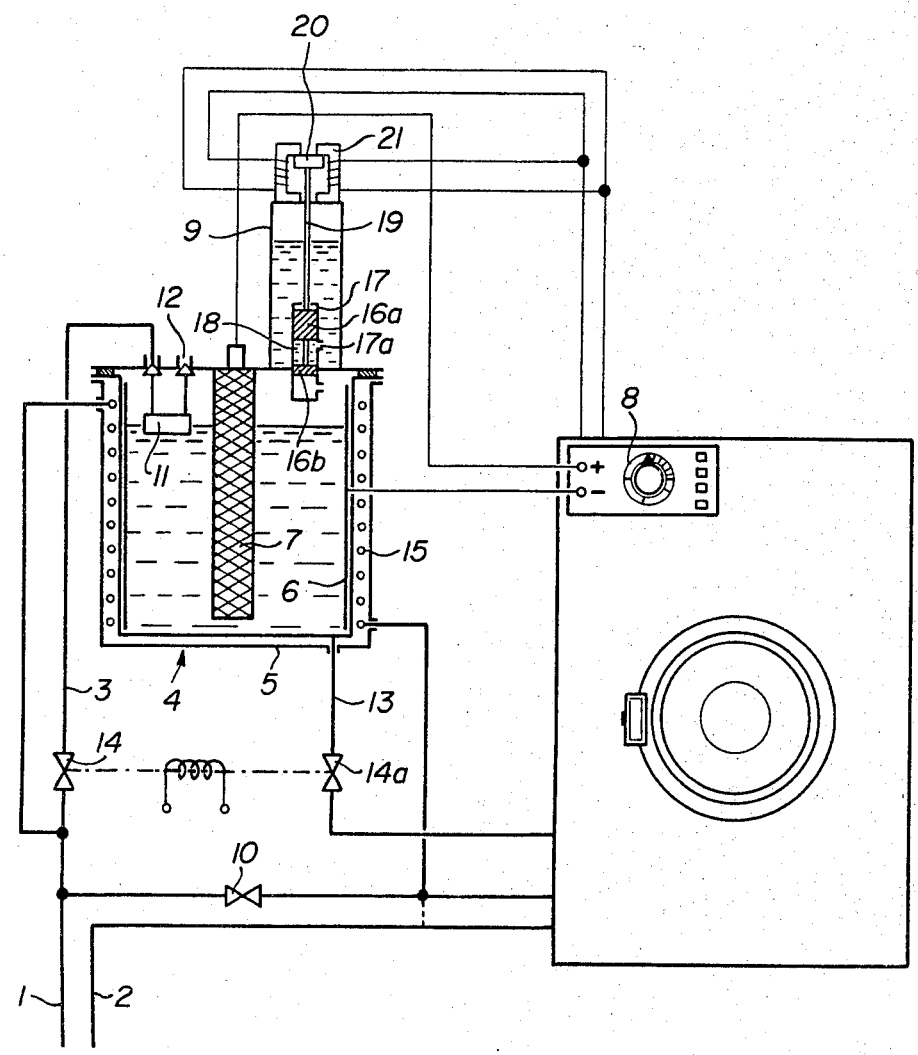
FIG. 1 is a diagram of the first embodiment in connection with a cloth-washer.

The washing machine pictured on FIG. 1 is supplied with water by a supply conduit 1, a discharging conduit 2 being used for discarding the waste water. The supply conduit 1 is linked, by means of a connecting conduit 3, to one inlet of an electrochemical cell 4. This cell comprises a stainless steel tank 5. The internal face of the side wall of this tank is provided with a tubular electrode 6 made of graphite, platinized titanium or stainless steel connected to the negative terminal of a power source and thus constituting a cathode. A second electrode 7 made of graphite, platinized titanium or of titanium coated with noble metals oxides is connected to the positive terminal of the power supply and constitutes the anode of the electrochemical cell which is arranged axially in the tank 5. The value of the current flowing into the electrodes 6 and 7 is determined as a function of the washing program and as of the desired concentration of the sodium hypochlorite. Consequently, by means of a program selector 8 which is usually provided on all automatic washing machines, the cell supply current is adjusted for the required value. The electrochemical cell 4 is not provided with a diaphragm so the chlorine and sodium hydroxide resulting from the electrolysis of the brine shall react together and form sodium hypochlorite. The sodium chloride necessary for providing the brine is contained in a distributor 9 provided with a sampling device which comprises a metering piston with two segments 16a and 16b, adapted in a dispensing tube 17 provided with an inlet opening 17a. This piston defines a chamber 18 between the two piston segments 16a and 16b. The volume of this chamber 18 is selected for corresponding to the minimal amount of brine necessary for feeding the electrochemical cell 4. The metering piston 16a, 16b is integral with a rod 19 which spreads outside the distributor 9 and ends with a ferromagnetic disk located within the gap of an electromagnet 21. The number of doses furnished by the metering piston determines the sodium chloride concentration of the electrolyte. A float double valve 11 controls the output of the connection conduit 3 to the electrochemical cell 4 and, simultaneously, the state of an opening 12 for communicating with the atmosphere. An outlet conduit 13 links the electrochemical cell 4 to the washing tank of the washing machine. This outlet conduit 13 and the connection conduit 3 are under simultaneous control from a two-way valve 14, 14a, one way being open when the other is closed and vice-versa.

The electrochemical cell is further provided with a cooling device constituted by a coil 15 surrounding the external face of the tank 5 and one end of which is linked to the connection conduit 3 upstream from valve 14 while the other end is linked either to the supply conduit 1 at a point situated downstream relative to the tie point for connecting conduit 3, or to the discharge conduit 2, depending on whether or not one wishes to recover the cooling water for washing or rinsing. When the output of coil 15 is connected to the supply conduit, an electrovalve 10 is provided between the tie points of conduits 3 and 13 with the supply conduit. Cooling the electrochemical cell is for maintaining the temperature of the electrolytic bath low enough to ensure that the yield of hypochlorite formation is good.

The amount of sodium hypochlorite generally used for disinfecting garments is comprised between 1.4 and 6 g, exceptionally up to 14 g. The molecular weight of NaOCl is 74.4. The production of one mole thus requires 53.6 Ah. For producing 1.4 g of NaOCl with a 100% yield, 1 Ah would be needed. With a Faraday yield of 80%, the required electricity is thus 1.2 Ah and if the production period is only 24 min, 3 A is required, the cell voltage being of the order of 3.5 to 9 V depending on the electrolyte concentration. The current density ranges from 5 to 10 A/dm$^2$, so each electrode has a surface from 0.25 to 0.5 dm$^2$. Depending on the desired hypochlorite quantity, the concentration of the electrolyte can vary from 1 to 30 g/l for a total capacity of the cell comprised between 0.8 and 1.5 dm$^3$ with a filling ratio of 70-80%. The amount of 1.4 g of NaOCl can be modified by varying either the period of production or the current or both parameters.

Loading of the electrochemical cell is carried out at the desired moment by introducing the desired number of metered amounts by means of the metering piston 16a, 16b driven by the electro-magnet 21. Once these amounts have been introduced as a function of the desired NaCl concentration for the electrolyte, water is introduced by opening the electro-valve 14 controlling the connection conduit 3 until the float valve 11 closes the inlet of this conduit 3 to the electrochemical cell 4. After the time necessary for the electrolytic production of sodium hypochlorite has elapsed, the current to the electrodes 6 and 7 is cut off and the position of the two-way valve is reversed so that the content of the electrochemical cell can discharge into the machine.

Naturally, the set-up of the metered quantities of sodium chloride, of the time of electrolysis of the solution and of the current intensity can be controlled by the general programming system of the machine so as to adapt the quantity of hypochlorite to each type of washing operation.

The metered quantities are also adaptable as a function of the desired use for the sodium hypochlorite.

As was mentioned above, usual disinfection operation require generally an amount of NaOCl of the order of 1.4 g for 20 l of water. However, depending on the volume of rinsing water, the sort of clothing, the colors and finishes of this clothing and the degree of disinfection desired, depending on whether the clothing is from normal origin or whether it may be particularly contaminated as with clothes worn by contagious patients for instance, the quantity of NaOCl can vary from 0.35 g to 14.0 g but, preferentially, from 1.4 g to 2.1 g in most cases.

The production of 14 g of NaOCl can be visualized under the following conditions:

The current density is raised to 25 A/dm$^2$ and te electrode surface to 1.5 dm$^2$ which can be distributed to three electrodes of 0.5 dm$^2$. With such current density, the NaOCl concentration can be of the order of 10 g/l so that the volume of electrolyte for obtaining 14 g of NaOCl shall have to be about 3 l. In these conditions, and provided that 12 Ah are necessary for producing 14 g of NaOCl with a Faraday yield of 80%, there shall be needed about 20 min time for producing said 14 g with 1.5 dm$^2$ of electrode surface under a current density of 25 A/dm$^2$. Although this is a borderline case, calculation shows that the various parameters implemented in this example are compatible with the contemplated application.

Soldium hypochlorite can further be used for javellizing linen, which operation includes disinfection and additional bleaching and can advantageously be effected during the second rinsing operation. In this case, and depending on the conditions required for the fabric to be treated and the type of machine, the metered quantity of NaOCl can vary from 3.5 to 7 g.

If hypochlorite is used as the bleaching agent in lieu of the perborate or hydrogen peroxide in the scouring bath, the metered quantities will vary, as a function of the various parameters, from 5 g and 14 g still for a 20 l volume scouring bath.

Figure 2:
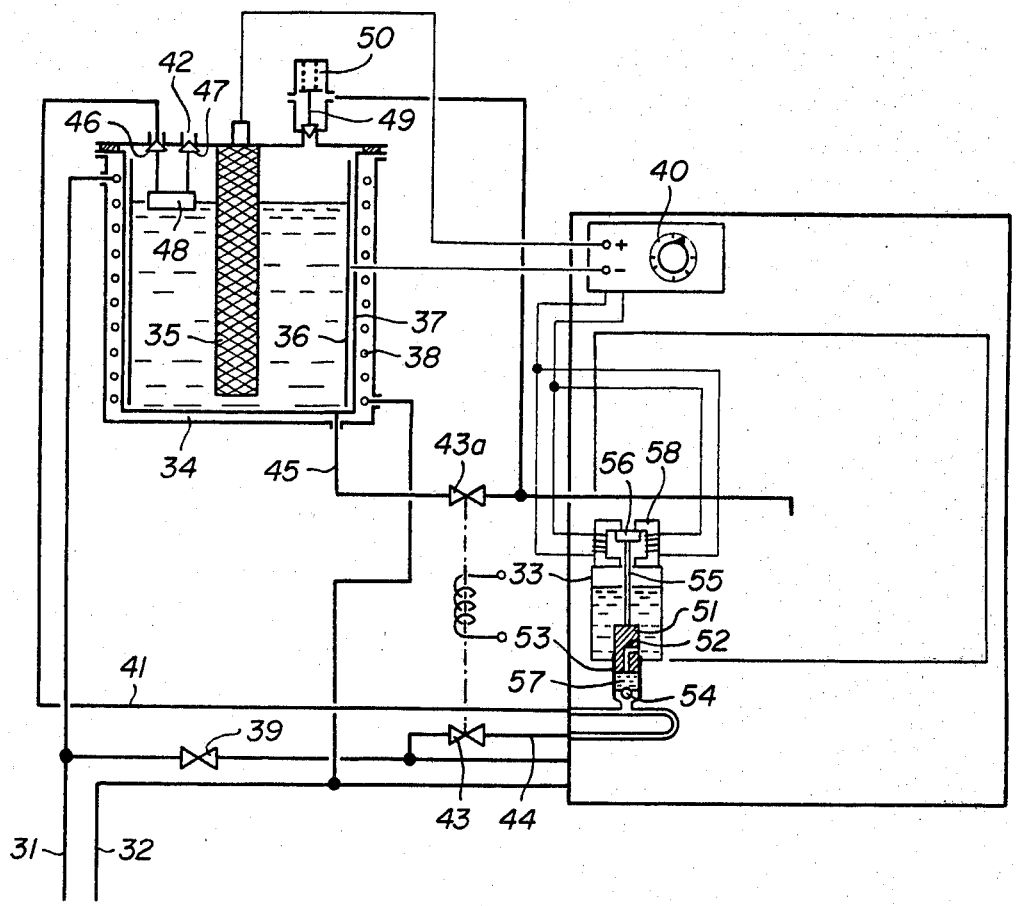
FIG. 2 is a diagram of the second embodiment in connection with a dish-washer.

The dish-washer illustrated on FIG. 2 comprises a water supply conduit 31 and a waste-water discharge conduit 32. This machine further comprises a brine tank 33 and an electrochemical cell 34. The size proportions shown for the machine and the cell 34 do not correspond to actuality. This cell 34 has an anode 35 of graphite or of platinized titanium and a tubular iron cathode 36 adapted inside of a cylindrical tank 37 of stainless steel, with no separator between the anode and the cathode. This tank is surrounded by a cooling coil one end of which is linked to the water supply conduit 31 and the other end is linked either to the discharge conduit 32, or to the supply conduit 31 at a point downstream from where the first end of this coil is connected to the same supply pipe 31. In this last case, an electrovalve 39 should be placed on the supply conduit 31 between the two tie points with the cooling coil 38, so that when the electrovalve 39 is closed, the cooling coil 38 constitutes a by-pass for the supply conduit 31.

The electrochemical cell 34 is fed with an adjustable intensity current for reasons to be explained later, this intensity being set up, preferably, as a function of the washing program of the machine, the latter being determined by a manual selector knob 40. This electrochemical cell comprises a feed conduit 41 bound to the brine tank 33, itself linked to the waste supply conduit 31 by an electro-valve 43 controlling a by-pass conduit 44. This electrovalve 43 belongs to a combined two-way electrovalve the second element 43a of which controls a conduit 45 connecting the outlet of the electrochemical cell 34 to the washing tank of the dish-water.

The feeding of the electrochemical cell 34 with the desired concentrations of sodium chloride adapted to the required quantities of hypochlorite depending on the washing cycle is achieved by means of a metering system comprising a piston 51 with an elbow bore 52 and adapted in a distribution tube 53 which opens at the junction point of the feed conduit 41 and the by-pass conduit 44. This distribution tube 53 is controlled by a non-return valve 54 normally closed by the pressure of the water in conduits 41 and 44. The piston 51 is integral with a rod 55 which extends to the outside of the brine tank 33 and which is terminated by a disk 56 located in the air-gap of a control electro-magnet 58. When the piston 51 is in a position remote from the non-return valve, a metering chamber is provided between this valve and the top of the piston. Since the valve 54 is closed when the piston 51 moves away from this valve 54, the chamber is under reduced pressure. As soon as the end part of the elbow bore 52 which opens in the side wall of the piston 51 is liberated by leaving the distribution tube 53, a metered quantity of brine is sucked into the chamber 57. Upon return of the piston 51, the elbow bore is closed as soon as its side port enters the distribution tube 53. The liquid in metering chamber 57 is then under pressure and forces the valve 54 to open. The metered quantity is injected into the water that circulates from the by-pass conduit 44 to the feed conduit 41.

The end of conduit 41 reaching the electrochemical cell 34 and an opening 42 to the atmosphere are under control from two valves connected to a float 48. A safety valve 49 under load from a spring 50 provides degassing of the cell 34 when the pressure exceeds a given level. This valve 49 can be linked to the conduit 45 to prevent chlorine gases to be released into the atmosphere.

As an example, the electrochemical cell 34 can have a capacity of 1 to 2 $dm^3$ with a filling ratio of electrolyte of the order of 60 to 80%, the NaCl concentration being from 1 to 30 g/l. The amount of powder for one washing operation is generally of the order of 30 g, to a maximum of 60 g and the presently available compositions comprise, for such an amount, quantities of active chlorine liberating organic compounds equivalent to 0.2 to 1.5 g of NaOCl. The electrical features of the cell for the production of NaOCl quantities of the same order are similar to those given for the cell of the cloth-washer when the quantities of NaOCl produced are equivalent. The heat generated by the electro-chemical reaction is evacuated with the water that circulates in the cooling coil 38 which prevents the formation of chlorate which would occur if the bath temperature were to rise. This heat can be recovered, for instance, in the course of the first rinse if the hypochlorite is produced at this time, for damping the thermal shock on the dish-ware.

Of course, the metered quantities of hypochlorite produced can be significantly different from that included in the washing products. For instance, since it is possible to decrease the time of action of the active chlorine compound, one can contemplate increasing the metered quantity so as to improve the bactericide and fungicide effect. For fabricating the required quantity of hypochlorite for a given washing cycle, the two-way electrovalve closes the valve 43a and opens the valve 43. Simultaneously, the piston 51 is actuated by the electro-magnet 58 for introducing one or several metered quantities corresponding to the volume of the chamber 57 into the water stream flowing in the conduit 41 toward the electrochemical cell 34, thus loading said water with the desired quantity of sodium chloride. When the cell is filled to the desired level, the valves 46 and 47 close the water inlet and the connection with the atmosphere. Electrodes 35 and 36 are supplied with the desired current. When the time required to produce the desired quantity of hypochlorite has elapsed, the electrovalve 43, 43a is operated reversely for emptying the content of the electrochemical cell into the washing drum of the machine.

The production of hypochlorite at the desired concentration can be set with reference to the various washing programs of the machine. The introduction of the desired amount of hypochlorite into the scouring bath or into rinsing bath can be chosen to be done at the best moment and for a given duration. The water temperature can also be fixed. In general, these options will be selected for having all conditions necessary to obtain an optimal fungicide and bactericide effect while seeking to avoid deleterious effects on the ware, particularly on decoration and cutlery. Preferably, the introduction of sodium hypochlorite will be effected during the end of the washing stage or during the first rinsing step after the washing stage. Naturally, the scouring product for forming the scouring bath in the washing stage has a simplified formulation and, especially, is free from any active chlorine compound. There has already been said that the absence of such compound enables to contemplate other detergent compositions and, especially, compositions containing an enzymatic system in the form of only one enzyme or a combination of specific enzymes. It is also possible to contemplate the use of dissolved aqueous detergent compositions which enables to store the scouring product for a relatively long period in a reservoir of the washer itself, so the dispensing thereof can be automatized, the replenishment of the reservoir being done after several consecutive washing operations.

The advantage of the invention disclosed here lies essentially in the fact of producing an oxidizing agent in the washer itself, for introducing it separately at the desired moment and with the desired concentration. With each operation, only the required metered quantity is produced thus avoiding storage problems. The quantity produced can be adapted, from case to case, to the type of wash and to the effect sought. The electrochemical cell associated with the machine can impart thereto a wide self-sufficientness so that the only contribution from the operator is to periodically filling the brine tank. Further, all modern dish-washers, at least in Europe, are already provided with a brine tank for regenerating the ionexchange resins of the water softeners; thus, in this case, the production of hypochlorite in the machine will not require particular attention from the user, the same holder-tank being used for both purposes.

The washing machine according to the invention enables, in addition, to solve different problems inherent to cloth-washers. The accurate metering of very dilute hypochlorite solutions enables to contemplate the disinfection of dyed fabrics with no direct interference from the user, i.e. without the risks inherent to human errors which may be much in the case of machines likely to be put in all hands.

We claim:

1. A fabric- or dish-washing machine comprising:
   a receptacle for receiving articles to be washed;
   a first conduit connected between a source of washing water and said receptacle for delivering washing water to said receptacle;
   a second conduit connected to said receptacle for discharging used washing water therefrom;
   a cell enclosing at least one anode and at least one cathode;
   a third conduit connected between a source of water and said cell;
   a fourth conduit connected between said cell and said receptacle for delivering hypochlorite solution formed in said cell to said receptacle;
   first, second, third and fourth valves respectively providing in said first, second, third and fourth conduits for respectively controlling the flow therethrough;
   a programmer connected to all of said valves for controlling the flow of water to and from said receptacle, the flow of water to said cell, and the flow of hypochlorite solution to said receptacle for washing of said articles;
   a reservoir containing a supply of sodium chloride;
   a metering device connected between said reservoir and said cell for feeding, upon operation of said metering device, sodium chloride to said cell; and
   control means responsive to said programmer for operating said metering device and controlling the electrical energization of said anode and said cathode whereby said anode and said cathode are energized and said sodium chloride is delivered to said cell at predetermined times in the cycle of operation of said machine for delivery of hypochlorite solution to said receptacle.

2. The machine defined in claim 1 wherein said metering device communicates with said third conduit at a location between said third valve and said cell.

3. The machine defined in claim 1, further comprising a cooling circuit having at least one heat exchanger connected by conduit branches with said first and second conduits.

4. The machine defined in claim 1, further comprising a cooling circuit having at least one heat exchanger connected by conduit branches to said receptacle.

5. The machine defined in claim 1, further comprising means in said third conduit for interrupting the flow of water into said cell upon the filling thereof to a predetermined level.

* * * * *